Jan. 25, 1944.   J. H. THORNBERY ET AL   2,340,234
TRIP MEANS FOR SAFETY CONTROL DEVICES AND THE LIKE
Filed July 10, 1939   2 Sheets-Sheet 1
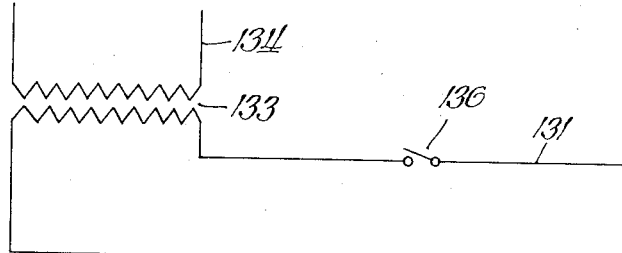
Fig.1.
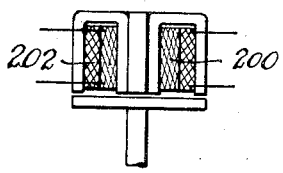
Fig.5.
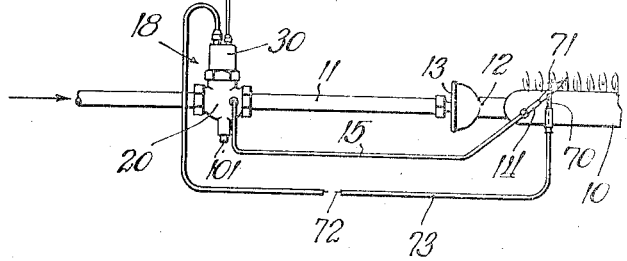
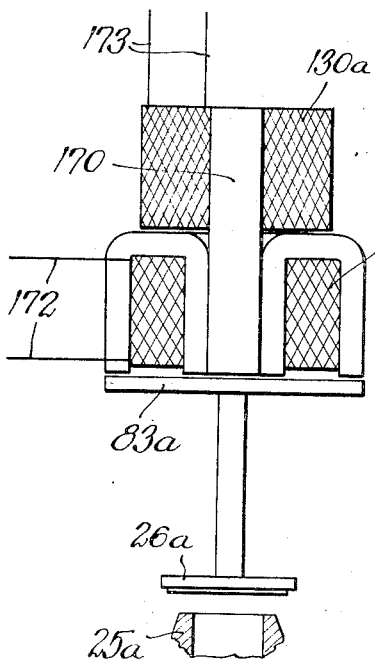
Fig.3.
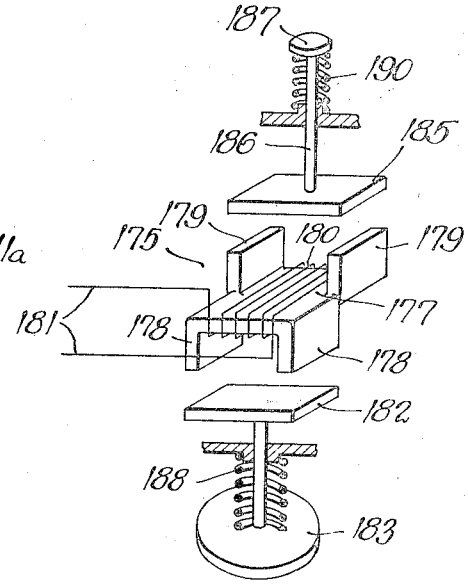
Fig.4.
Inventors:
John H. Thornbery,
Theodore A. Wetzel.
By Brown, Jackson, Boettcher & Dienner
Attys.

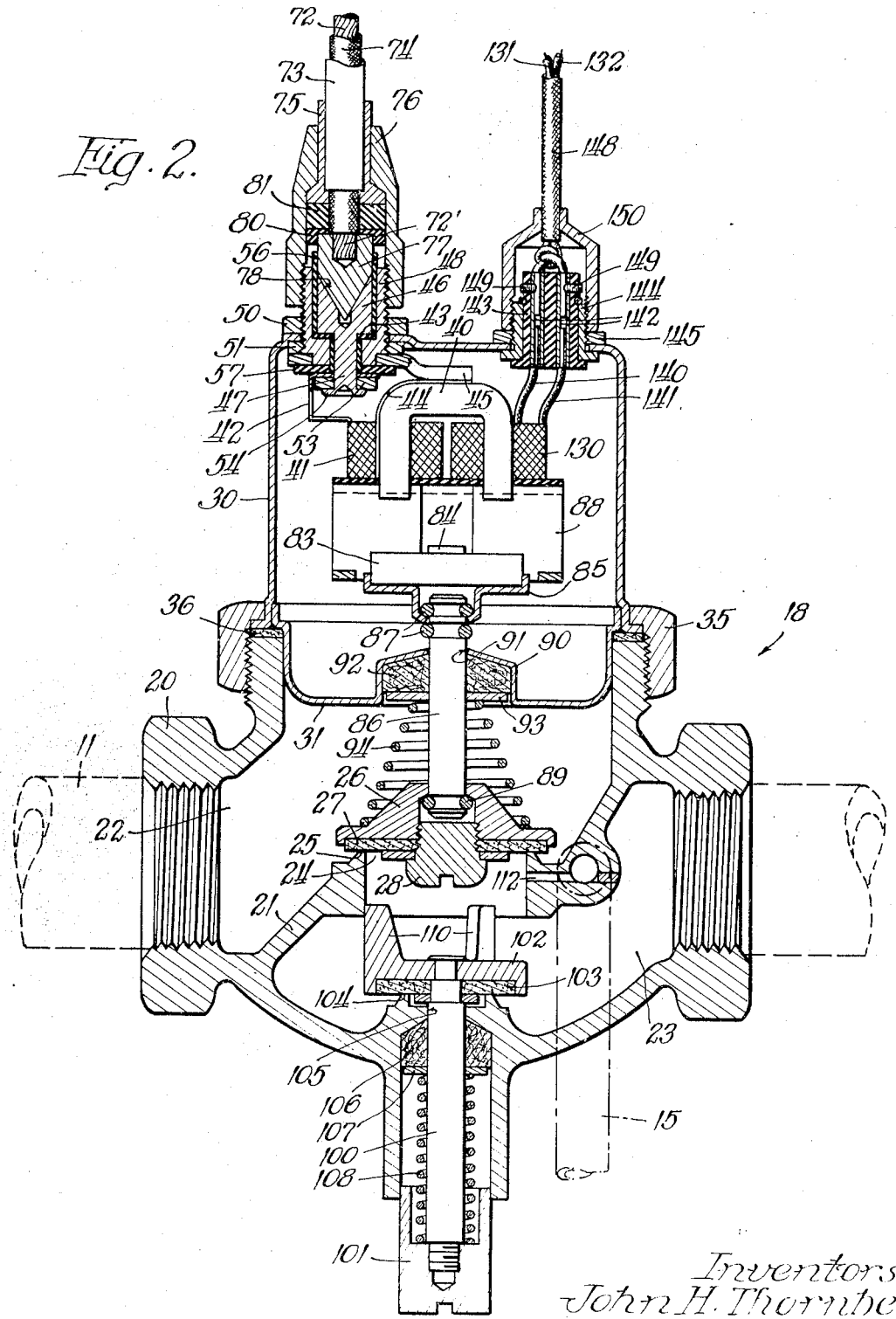

Patented Jan. 25, 1944

2,340,234

UNITED STATES PATENT OFFICE 2,340,234

TRIP MEANS FOR SAFETY CONTROL DEVICES AND THE LIKE

John H. Thornbery and Theodore A. Wetzel, Milwaukee, Wis., assignors to Milwaukee Gas Specialty Company, Milwaukee, Wis., a corporation of Wisconsin Application July 10, 1939, Serial No. 283,572

5 Claims. (Cl. 158—117.1)

This invention relates, generally, to control devices, and has particular relation to a safety control device for burners and the like whereby a valve in the gas or other fuel supply line is held open, for example when a pilot flame is burning, and is closed when the pilot flame goes out.

Thermo-electric safety controls having an electromagnet provided with an armature connected to a controlling member, such as a valve or an electric switch for controlling a solenoid valve or the like and a thermocouple adapted to be subjected to the heat of the pilot flame and electrically connected with the electromagnet whereby the armature and controlling member are held in operating position by the thermo-electric current flowing through the electromagnet when the thermocouple is heated by the pilot flame but in which, on extinguishment of the pilot flame, the controlling member is released and moves to retracted position for shutting off the flow of fuel to the burner have been provided heretofore in the art.

The principal object of the present invention is to provide improved means for tripping the thermo-electric control device to release the controlling member for movement to retracted position.

Another and more specific object is to provide trip means that is operable to cancel out, short-circuit, or reduce the magnetic attraction set up by the thermo-electric current so that the same will be ineffective to hold the armature and controlling member in attracted position, whereupon the controlling member is released and moves to retracted position to shut off the flow of fuel to the burner.

Another object of the present invention is to provide trip means of the character above set forth that is adapted to be arranged for operation remote from the safety control device or from position in close proximity or adjacent the safety control device as desired.

Further objects and advantages of the invention will be apparent from the following detailed description, taken in connection with the accompanying drawings in which:

Figure 1 is a fragmentary and more or less diagrammatic view showing an embodiment of the present invention in a main burner and pilot burner fuel supply system;

Figure 2 is a vertical section through the thermo-electric safety shut-off valve showing an embodiment of the present invention in connection in connection therewith;

Figure 3 is a fragmentary detail and more or less diagrammatic section showing another arrangement of the thermo-electric current and trip coils embodying the present invention;

Figure 4 is a more or less diagrammatic perspective view showing another form of thermo-electric current energized electromagnet and trip means embodying the present invention; and Figure 5 is a fragmentary and more or less diagrammatic view showing another embodiment of the present invention.

Referring first to Figure 1 of the drawings, the burner 10 is any suitable or preferred main burner, and the conduit 11 is the fuel supply conduit therefor. The fuel may be gaseous fuel, oil, or any other desired fuel. Where the fuel is a gaseous fuel the burner 10 is preferably fed from the conduit 11 by the usual feed pipe 12 to which air is admitted, in the usual way, at 13.

Located in lighting proximity to the main burner 10 is the usual or any suitable or preferred pilot burner, indicated more or less diagrammatically at 14, which pilot burner is adapted to remain lighted for the purpose of relighting the main burner 10 upon extinguishment thereof. The pilot burner 14 is supplied with gaseous fuel by a tube 15 connected to the thermo-electric safety device, as will hereinafter appear.

As set forth herein, the thermo-electric safety device may be in the form of a valve, switch, or other cnotrol means. The particular device shown in the drawings is a thermo-electric safety valve designated in its entirety at 18, and of the character shown and described in the copending application of Henry F. Alfery, Serial No. 186,967, filed January 26, 1938, now Patent No. 2,267,909. It comprises a valve casing 20 (Figure 2) connected into the conduit 11 and divided internally by a partition wall 21 into an inlet chamber 22 and an outlet chamber 23. The partition 21 has a valve opening 24 provided on the inlet side with a surrounding valve seat 25. The flow of gaseous fuel through the valve opening 24 is controlled by a valve member 26 preferably provided with a suitable valve seating member 27 of yielding character that is secured to valve member 26 by a screw 28 and engages the valve seat 25 when the valve is closed.

Mounted upon the top of the valve body 20 is a housing comprising a downwardly opening cup-shaped shell 30 and an upwardly opening cup-shaped shell 31. The shell 30 has an enlarged lower end fitting telescopically over the enlarged upper end of the shell 31. The lower end of the shell 30 has an outwardly extending annular flange and the two shells are clamped in place to the top of the valve body 20 by a nut member 35, a suitable sealing gasket being preferably provided as indicated at 36.

A generally U-shaped magnet frame member 40 is mounted in the shell or hood member 30, and this magnetic frame member 40 is provided with an electromagnetic coil indicated at 41. The coil 41 surrounds one of the legs of the magnetic frame member 40, and one terminal of the coil is connected at 42 to a terminal stud 43. The other terminal of the coil 41 is connected at 44 to a metallic terminal plate 45. The stud 43 has an enlarged upper end 46 and a reduced stem 47 depending therefrom. This stud fits in a correspondingly formed bushing member 48, which bushing member is externally threaded and clamped in place in an opening in the top of the shell 30 by nut members 50 and 51.

The lower end of the bushing 48, which constitutes a terminal bushing, is reduced, and this reduced lower end of the bushing fits in an opening in the plate member 45 and is electrically connected thereto. The stud 43 is insulated from the bushing 48, and the connection at 42 between the coil and the stud 43 is insulated from the terminal plate 45 and bushing 48 at 56 and 57. The terminal of the coil 41 which is connected to the terminal stud 43, is clamped in place between the insulation at 57 and the contact washer 53, the lower end of the stud 43 being headed or riveted over at 54. The plate member 45 provides support for the magnetic frame 40 which is secured thereto in any suitable or desired manner.

The thermocouple, indicated at 70, may be of any existing or other suitable or preferred form— for example, of the type disclosed and claimed in Oscar J. Leins Patent No. 2,126,564, patented August 9, 1938. The hot junction 71 of the thermocouple is disposed in proximity to the pilot burner 14 so as to be responsive to the heat of the pilot flame for the main burner 10 at all times. One element of the thermocouple, i. e., the internal element of the thermocouple of the character set forth in the Leins patent, is joined to the lead wire 72 (Figure 2) which constitutes one part of the lead connection between the coil 41 and the thermocouple. The other part of the lead connection comprises a metallic tube 73 connected to the other element of the thermocouple, i. e., to the external thermocouple element where the thermocouple is of the character set forth in the Leins patent. The lead tube 73 is insulated from the lead wire 72 by the insulation on this wire, as indicated at 74.

The metallic tube 73 enters and is connected at 75 to a metallic thimble member 76 having threaded engagement with the externally threaded end of the terminal bushing 48. The adjacent end of the lead wire 72 has metallic connection at 72' with a terminal member 77. The terminal member 77 has a conical end 78 which seats in a recess of corresponding conical form in the outer end of the terminal stud 43 and forms a metallic contact between the member 77 and stud 43. Terminal member 77 may be held centered in the thimble 76 by a centering member 80 fitting within the thimble and engaging the upper end of the member 77 as shown. Suitable insulation is preferably provided as indicated at 81, and the conical end of the terminal 77 is clamped in contact with the conical recess surface of the stud 43 by the thimble 76.

From the foregoing description and the drawings it will now be apparent that one element of the thermocouple 70, i. e., the internal element where the thermocouple is of the character disposed in the Leins patent, is connected through lead wire 72, terminal member 77, stud 43, and connection at 42, to one terminal of the coil 41, and that the other element of the thermocouple, i. e. the external thermocouple element where the thermocouple is of the character set forth in the Leins patent, is connected through the thimble 76, terminal bushing 48, metallic terminal plate 45, and connection 44, to the other terminal of the coil 41.

The free ends of the magnetic frame member 40 constitute pole faces, and the magnet armature 83 is held against these pole faces by the magnetic field produced in the frame 40 by the thermo-electric current set up in the coil 41 due to the action of the heat of the pilot flame on the hot junction 71 of the thermocouple when the pilot flame is burning.

The armature 83 has attached thereto by upwardly extending bent-over portions 84 a cradle 85 which, in turn, is connected to the upper end of the valve stem 86, preferably for limited universal movement by means of U-shaped retainers 87 engaging in grooves in the upper end of the stem 86. The armature 83 is guided for reciprocating movement by an armature guide 88, and the valve member 26 is connected to the lower end of the stem 86 preferably for limited universal movement with respect to the stem by means of a retainer 89 engaging in a groove in the valve stem.

The bottom wall of the shell 31 is depressed at 90 and provided with an opening 91 in which the stem has reciprocating movement. The opening 91 is sealed against the leakage of gas from the valve body 20 into the enclosure formed by the shells 30 and 31 by suitable packing indicated at 92. A washer is provided at 93, and surrounding the valve stem 86 and interposed between the washer 93 and the valve member 26 is a generally conically coiled spring 94. This spring 94 compresses the packing 92, and when the coil 41 is deenergized the spring 94 moves the valve member 26 to closed position against the seat 25 to shut off the supply of gaseous fuel to the main burner 10.

For the purpose of resetting the device after the coil 41 is deenergized and the valve 26 closed, a resetting stem 100 is mounted for sliding movement in the valve body 20 in axial alignment with the valve opening 24. Secured upon the lower end of the stem 100 is a resetting button 101, and fixed upon the upper end of the stem is a valve member 102. The valve member 102 has a valve seating surface 103 which engages an annular valve seat 104 to prevent leakage of gas through the opening 105 in which the stem 100 operates. This opening 105 is additionally sealed against leakage of gas by suitable packing indicated at 106. A washer is provided at 107, and surrounding the stem 100 and interposed between the washer 107 and the resetting button 101 is a coil spring 108 which holds the valve member 102 against the seat 104 and the button 101 in the position shown.

The valve member 102 has upstanding lugs 110 which, in the resetting operation, engage the valve member 26 and force the same to open position away from its seat 25 and the armature 83 into engagement with the pole faces of the magnet frame 40 against the tension of the spring 94. The lugs 110 may have sliding movement in the valve opening 24 for the purpose of guiding the valve member 102 and resetting stem 100. When the resetting stem has been pressed upwardly sufficiently to bring the armature 83 into contact with the magnet frame 40, the valve member 102 preferably shuts off, or substantially shuts off, the flow of gaseous fuel through the valve opening 24. This eliminates the possible flow of gaseous fuel to the main burner 10 until the pilot burner is ignited and the coil 41 is energized to hold the armature 83 against the magnet frame 40 and the valve 26 in open position.

The valve body 20 has a passageway 112 connected to the tube or gas supply line 15 for delivering gaseous fuel to the pilot burner 14. This passageway 112 by-passes the valve member 102 when the valve 102 is in raised position, shutting off, or substantially shutting off, the flow of gaseous fuel to the main burner 10 during the resetting operation. At the same time this passageway 112 is so disposed that the valve member 26 operates to shut off not only the supply of gaseous fuel to the main burner 10 but also the supply of gaseous fuel to the pilot burner 14 when the valve member 26 is closed against its seat 25.

The details of the thermo-electric shut-off valve may vary widely within the scope of our present invention, and, as already pointed out, the safety shut-off device may be in the form of a thermo-electrically controlled switch instead of in the form of a valve or of other desired character within the scope of the broader aspects of our present invention.

The means for tripping the thermo-electric safety control device 18 comprises a trip coil 130 surrounding the other leg of the magnet member 40. The terminals of the coil 130 are connected by conductors 131 and 132 to a suitable source of current—for example, through a transformer 133 to an alternating current circuit 134. The circuit 134 may, for example, be an alternating current lighting circuit or any other alternating current circuit supplied by a suitable source of alternating current (not shown), although, of course, a direct current tripping circuit may be employed within the scope of the present invention.

The coils 41 and 130 are so wound and so connected that when both coils 41 and 130 are energized, release of the armature 83 results. The pulsating nature of the alternating current provides an instantaneous condition in the magnet frame 40, which permits the spring 94 to retract the armature 83 sufficiently to provide an instantaneous increase in the air gap to the armature. This precludes further attraction of the armature to the magnet frame 40, which results in release of the armature and movement of the same to retracted position.

Energization of the trip coil 130 is controlled by a trip switch 136 in the circuit including the conductors 131 and 132.

In any case, the switch 136 is adapted to be arranged for operation remote from the safety control device or from position adjacent or in close proximity to the safety control device, as desired.

In Figure 2, the terminal leads of the trip coil 130 are indicated at 140 and 141. The bared outer ends of these leads are secured, for example, in metallic connector sleeves 142 in electric contact therewith. The connector sleeves 142 are fixed in an insulating bushing 143 that, in turn, is fixed in a metal bushing 144 clamped in an opening in the top of the shell 30 by a nut 145 having threaded engagement with the external threads on the bushing 144. The conductors 131 and 132, which may be insulated and stranded together at 148, have their bared ends secured in the outer ends of the connector sleeves 142 in electric contact therewith, and are electrically connected with the terminal leads 140 and 141 through the sleeves 142. The conductors 131 and 132 may be detachably secured in place in the sleeves 141 by screws 149. A closure cap 150 encloses the connection thus afforded, and has threaded engagement with the metal bushing 144, and also has an opening for the entry of the conductors 131 and 132.

The operation of the device is as follows: When it is desired to ignite or reignite the main burner 10 with the parts positioned as shown in Figure 2, the resetting button 101 is manually pushed upwardly. This moves the valve member 26 upwardly away from its seat 25 and the armature 83 into contact with the magnet frame 40 where it is held by holding the button 101 in raised position. In this raised position of the resetting stem 100 the valve 102 shuts off, or substantially shuts off, the flow of gaseous fuel to the main burner 10 to prevent the escape of gaseous fuel from the main burner during the resetting operation.

The valve member 26 is open, however, at this time, and the passageway 112 by-passing the valve 102 sets up the desired supply of gaseous fuel through the tube 15 to the pilot burner 14 where it can be ignited as it issues from the pilot burner by applying a match or otherwise as desired. The resulting pilot flame energizes the thermocouple 70, creating a thermo-electric current which energizes the coil 41 and causes the armature 83 to be held against the magnet frame 40 and the valve 26 to be held in open position against the tension of the spring 94. When the coil 41 is so energized to hold the valve 26 open, the resetting button 101 is released and the spring 108 moves the resetting stem downwardly to the position shown in Figure 2, and with it the valve 102 to open position.

The gaseous fuel then flows through the valve opening 24 and out through the fuel supply line to the feed pipe to which air is admitted and the gaseous mixture enters the main burner 10 where it is ignited by the pilot flame at the pilot burner 14 as it issues from the ports of the main burner. In case the main burner 10 is accidentally extinguished, the pilot burner 14 will reignite the same, and thereby assures that the main burner is lighted so long as the valve 26 is open.

If the pilot burner is extinguished, the thermo-electric current through the coil 41 diminishes to such a degree that the armature is released, whereupon the spring 94 forces the valve member 26 into engagement with the valve seat 25, thereby shutting off the flow of fuel to the main burner 10, and, in the illustrated embodiment of the invention, to the pilot burner 14.

On the other hand, with the pilot burner 14 ignited and the valve 26 held open by the thermo-electric current developed by the pilot burner, closing of the trip switch 136 manually or automatically at a predetermined temperature or pressure energizes the trip coil 130. The energization of this coil 130 produces an instantaneous condition in the magnet frame 40 which results in release of the armature 83 and movement of the valve member 26 to closed or retracted position by the spring 94. As soon as the switch 136 is opened, the thermo-electrically controlled device may be reset as previously described.

In the embodiment of the invention shown fragmentarily and diagrammatically in Figure 3, the thermo-electric current coil 41a is wound around the inner legs of the magnet frame, between which is located the common core 170. Trip coil 130a is wound around the core 170 and so connected that, upon energization, there is produced in the magnet frame an instantaneous condition which results in release of the armature 83a for the purpose of tripping the device. As a result, when the trip circuit is closed the condition produced in the magnet frame by the energization of the coil 130a releases the armature 83a and the valve member 26a is moved to retracted or closed position against the valve seat 25a. The terminal leads for the thermo-electric coil 41a are indicated at 172, and the terminal leads for the trip coil 130a are indicated at 173.

In the embodiment of the invention illustrated in Figure 4, the magnet frame member of the electromagnet 175 has a web portion 177 with a pair of downwardly extending legs 178 at one end and a pair of upwardly extending legs 179 at the opposite end, providing, in effect, a pair of connected and reversely positioned U-shaped portions. The thermo-electric coil 180, which is connected by leads 181 to a thermocouple such as that illustrated at 70 in Figure 1, is wound around the web portion 177 of the magnet frame. Upon energization of the thermo-electric coil 180, magnetic lines of force are produced forming unlike poles at the free ends of the legs 178. The magnetic attraction thus produced will hold the armature 182 in position attracted to the magnet frame and the connected valve 183 in open position or other controlling member in attracted position.

A short-circuit or bridge member 185 carried by a stem 186 provided with a button or fingerpiece 187 is adapted to be pressed manually or otherwise into bridging engagement with the legs 179 of the magnet frame, and in this position bridges or short-circuits the magnet flux set up by the thermo-electric current so that it is reduced sufficiently to release the armature 182, and the valve, switch, or other device is thereupon moved to retracted position, for example by a spring 188. A spring 190 may be provided for projecting the short-circuiting or bridging member 185 out of bridging relation with respect to the legs 179 upon completion of the tripping operation, or the bridge member 185 may be moved manually or otherwise out of bridging position.

In the embodiment shown in Figure 5, the thermo-electric current coil 200 and tripping coil 202 are wound one about the other and so connected that the tripping coil 202, upon energization, sets up lines of force in opposition to the lines of force set up by the thermo-electric current coil 200 for the purpose of tripping the device.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

We claim:

1. In a fuel supply safety control system, a main burner, a fuel supply pipe leading to said burner, a valve member in said pipe, an igniter for said main burner, a thermoelectric generator adapted to be energized by the igniter, a magnet frame, a coil wound on said magnet frame and connected in circuit with said thermoelectric generator, an armature connected to the valve member and adapted to be held attracted to said magnet frame to hold said valve member open when said coil is energized by said thermoelectric generator, a separate trip coil wound on said magnet frame, a constantly available source of current separate from said thermoelectric generator and the circuit therefor and in circuit with said trip coil for energizing said trip coil to reduce the effective magnetic attraction produced in said magnet frame by said first coil, and switch means controlling the circuit for said trip coil independently of the position of said armature, said last mentioned circuit being open whenever said armature is held in attracted position by energization of said first coil.

2. In a fuel supply safety control system, a main burner, a fuel supply pipe leading to said burner, a valve member in said pipe, a pilot burner for said main burner, a thermoelectric device controlling said valve member comprising a generally U-shaped magnet frame having a coil wound about one leg thereof, a thermocouple placed in position to be heated by said pilot burner and connected in circuit with said coil, an armature connected to said valve member adapted when attracted to said magnet frame to maintain said valve member in open position and adapted to be retracted for movement of said valve member to closed position, a separate trip coil wound about the other leg of said magnet frame and adapted when energized to reduce the effective magnetic attraction produced in said magnet frame by said first coil, a constantly available source of electric current connected in circuit with said trip coil independently of said thermocouple and the circuit connections between said thermocouple and said first coil, and switch means controlling said trip coil circuit independtntly of the direct heat produced by said main burner and independently of said armature.

3. In a fuel supply safety control system, a main burner, a fuel supply pipe leading to said burner, a valve member in said pipe, a pilot burner for said main burner, a thermoelectric device controlling said valve member comprising a magnet frame having a core and a coil wound about said core, a thermocouple positioned to be heated by said pilot burner and connected in circuit with said coil, an armature connected to said valve member adapted to be held attracted to said magnet frame and to maintain said valve member in open position upon energization of said coil and movable to retracted position for movement of said valve member to closed position, a separate trip coil wound about the core of said magnet frame and adapted when energized to reduce the effective magnetic attraction produced in said magnet frame by said first coil, a transformer providing a constantly available source of electric current connected in circuit with said trip coil independently of said thermocouple and the circuit connections between said thermocouple and said first coil, and switch means controlling said trip coil circuit.

4. In a fuel supply safety control system, a main burner, a fuel supply pipe leading to said burner, a valve member in said pipe, an igniter for said burner, means controlling said valve member comprising an electromagnet having an energizing coil, a thermoelectric generator disposed to be heated by said igniter and connected in circuit with said coil, an armature connected to said valve member adapted to be held attracted to said electromagnet upon energization of said coil to maintain said valve member in open position and movable to retracted position for movement of said valve member to closed position, and release means operable independently of said armature and of the circuit of said coil and the circuit connections between said coil and said thermocouple for reducing the effective magnetic attraction of said electromagnet for said armature sufficiently to permit the latter to move to retracted position.

5. In a fuel supply safety control system, a main burner, a fuel supply pipe leading to said burner, a valve member in said pipe, an igniter for said burner, means controlling said valve member comprising an electromagnet having an energizing coil, a thermoelectric generator disposed to be heated by said igniter and connected in circuit with said coil, an armature connected to said valve member adapted to be held attracted to said electromagnet upon energization of said coil to maintain said valve member in open position and movable to retracted position for movement of said valve member to closed position, and release means operable independently of said armature and of the circuit of said coil and the circuit connections between said coil and said thermocouple for reducing the effective magnetic attraction of said electromagnet for said armature sufficiently to permit the latter to move to retracted position, said release means comprising a bridging member normally in inoperative position and movable therefrom to an operative position effective for diverting from said armature a substantial portion of the magnetic flux of said electromagnet.

JOHN H. THORNBERY.
THEODORE A. WETZEL.